US012756045B2

(12) United States Patent
Pucher

(10) Patent No.: US 12,756,045 B2
(45) Date of Patent: Oct. 6, 2026

(54) BATTERY FRAME, BATTERY PACK, ELECTRIC VEHICLE, METHOD OF ASSEMBLING A BATTERY FRAME, AND METHOD OF ASSEMBLING A BATTERY PACK

(71) Applicant: SAMSUNG SDI CO., LTD., Yongin-si (KR)

(72) Inventor: Matthias Pucher, Lebring (AT)

(73) Assignee: SAMSUNG SDI CO., LTD., Yongin-si (KR)

( * ) Notice: Subject to any disclaimer, the term of this patent is extended or adjusted under 35 U.S.C. 154(b) by 809 days.

(21) Appl. No.: 17/969,595

(22) Filed: Oct. 19, 2022

(65) Prior Publication Data

US 2023/0123420 A1 Apr. 20, 2023

(30) Foreign Application Priority Data

Oct. 20, 2021 (EP) .................................... 21203601
Oct. 19, 2022 (KR) ........................ 10-2022-0135248

(51) Int. Cl.
*H01M 50/209* (2021.01)
*H01M 10/625* (2014.01)
(Continued)

(52) U.S. Cl.
CPC ....... *H01M 50/209* (2021.01); *H01M 10/625* (2015.04); *H01M 10/6556* (2015.04); (Continued)

(58) Field of Classification Search
CPC ......... H01M 10/6556; H01M 10/6557; H01M 10/6567; H01M 10/6568; H01M 50/20–293
See application file for complete search history.

(56) References Cited

U.S. PATENT DOCUMENTS

2009/0142650 A1 6/2009 Okada et al.
2018/0026243 A1 1/2018 Stojanovic et al.
(Continued)

FOREIGN PATENT DOCUMENTS

CN 107644960 A 1/2018
CN 110870094 A 3/2020
(Continued)

OTHER PUBLICATIONS

European Office Action issued in corresponding EP Application No. 21 203 601.6, dated Apr. 22, 2024, 4 pages.
(Continued)

*Primary Examiner* — Allison Bourke
*Assistant Examiner* — Travis L. Martin
(74) *Attorney, Agent, or Firm* — WOMBLE BOND DICKINSON (US) LLP

(57) ABSTRACT

A battery frame for providing structural support for a battery pack for retaining rows of stacked battery cells is provided. The battery frame includes a plurality of longitudinal beams and a plurality of crossbeams arranged between and connected to the longitudinal beams. The crossbeams are arranged in parallel to each other and include two outer crossbeams and an inner crossbeam. The inner crossbeam is arranged between the outer crossbeams. A retaining section for retaining one of the rows of stacked battery cells is provided between any neighboring pair of the crossbeams so that the rows of stacked battery cells and the inner crossbeam are alternately arranged between the two outer crossbeams. Each of the crossbeams is connected to the longitudinal beams by a plurality of fasteners extending in a longitudinal direction of the crossbeams through the longitudinal beams and into the crossbeams.

15 Claims, 8 Drawing Sheets

(51) Int. Cl.
*H01M 10/6556* (2014.01)
*H01M 50/258* (2021.01)
*H01M 50/264* (2021.01)

(52) U.S. Cl.
CPC ....... *H01M 50/258* (2021.01); *H01M 50/264* (2021.01); *H01M 2220/20* (2013.01)

(56) References Cited

U.S. PATENT DOCUMENTS

| | | | | |
|---|---|---|---|---|
| 2020/0148066 | A1 | 5/2020 | Sekar et al. | |
| 2020/0251698 | A1* | 8/2020 | Paramasivam ..... | H01M 10/613 |
| 2020/0411814 | A1 | 12/2020 | Ju et al. | |
| 2021/0119282 | A1* | 4/2021 | Wünsche ............ | H01M 10/647 |
| 2024/0387926 | A1* | 11/2024 | Wang .................. | H01M 50/244 |

FOREIGN PATENT DOCUMENTS

| | | | |
|---|---|---|---|
| CN | 210984833 | U | 7/2020 |
| CN | 112997351 | A | 6/2021 |
| DE | 10 2019 121 964 | A1 | 2/2021 |
| EP | 3273500 | A1 | 1/2018 |
| EP | 3664186 | A1 | 6/2020 |
| FR | 3 086 804 | A1 | 4/2020 |

OTHER PUBLICATIONS

Extended European Search Report issued in corresponding application No. EP21203601.6, dated Apr. 21, 2022, 7 pages.
Chinese Office Action issued in corresponding CN Patent Application No. 202211285761,7, dated Aug. 13, 2025, 9 pages.

* cited by examiner

BATTERY FRAME, BATTERY PACK, ELECTRIC VEHICLE, METHOD OF ASSEMBLING A BATTERY FRAME, AND METHOD OF ASSEMBLING A BATTERY PACK

CROSS-REFERENCE TO RELATED APPLICATION

This application claims priority to and the benefit of European Patent Application No. 21203601.6, filed in the European Patent Office on Oct. 20, 2021, and Korean Patent Application No. 10-2022-0135248, filed in the Korean Intellectual Property Office on Oct. 19, 2022, the entire content of both of which are incorporated herein by reference.

BACKGROUND

1. Field

Aspects of embodiments of the present disclosure relate to a battery frame, an electric vehicle, a method of assembling a battery frame, and a method of assembling a battery pack.

2. Description of the Related Art

Recently, vehicles for transportation of goods and peoples have been developed that use electric power as a source for motion. Such an electric vehicle is an automobile that is propelled by an electric motor using energy stored in rechargeable (or secondary) batteries. An electric vehicle may be solely powered by batteries or may be a hybrid vehicle powered by, for example, a gasoline generator. Furthermore, the vehicle may include a combination of an electric motor and a conventional combustion engine. Generally, an electric-vehicle battery (EVB, or traction battery) is a battery used to power the propulsion of battery electric vehicles (BEVs). Electric-vehicle batteries differ from starting, lighting, and ignition batteries in that they are designed to provide power for sustained periods of time. A rechargeable (or secondary) battery differs from a primary battery in that it is designed to be repeatedly charged and discharged, while the latter provides an irreversible conversion of chemical to electrical energy. Low-capacity rechargeable batteries are used as power supply for small electronic devices, such as cellular phones, notebook computers, and camcorders, while high-capacity rechargeable batteries are used as power supply for hybrid vehicles and the like.

Generally, rechargeable batteries include an electrode assembly including a positive electrode, a negative electrode, and a separator interposed between the positive and negative electrodes, a case receiving (or accommodating) the electrode assembly, and an electrode terminal electrically connected to the electrode assembly. An electrolyte solution is injected into the case to enable charging and discharging of the battery via an electrochemical reaction of the positive electrode, the negative electrode, and the electrolyte solution. The shape of the case, such as cylindrical or rectangular, may be selected based on the battery's intended purpose. Lithium-ion (and similar lithium polymer) batteries, widely known via their use in laptops and consumer electronics, dominate the most recent group of electric vehicles in development.

Rechargeable batteries may be used as a battery module formed of a plurality of unit battery cells coupled to each other in series and/or in parallel to provide a high energy density, such as for motor driving of a hybrid vehicle. For example, the battery module may be formed by interconnecting the electrode terminals of the plurality of unit battery cells in an arrangement or configuration depending on a desired amount of power and to realize a high-power rechargeable battery.

A battery pack is a set of any number of (often identical) battery modules. They may be configured in a series, parallel or a mixture of both to deliver the desired voltage, capacity, or power density. Battery packs include the individual battery modules and the interconnects, which provide electrical conductivity between them.

The mechanical integration of such a battery pack includes appropriate mechanical connections between the individual components (e.g., within battery modules and between them and a supporting structure of the vehicle). These connections should remain functional and safe throughout the average service life of the battery system. Further, installation space and interchangeability requirements must be met, especially in mobile applications.

Mechanical integration of battery modules may be achieved by providing a carrier framework and by positioning the battery modules thereon. Fixing the battery cells (or battery modules) may be achieved by, for example, fitted depressions in the framework or by mechanical interconnectors, such as bolts or screws. In some cases, the battery modules are confined by fastening side plates to lateral sides of the carrier framework. Further, cover plates may be fixed atop and below the battery modules.

The carrier framework of the battery pack is mounted to a carrying structure of the vehicle. When the battery pack is to be fixed at the bottom of the vehicle, the mechanical connection may be established from the bottom side by, for example, bolts passing through the carrier framework of the battery pack. The framework is often made of aluminum or an aluminum alloy to lower the total weight of the construction.

The carrier framework for a battery pack is also referred to as "battery frame" or simply the "frame" or "rack". The mechanical structure of a typical battery for an electric vehicle, a hybrid electric vehicle, or a plug-in hybrid vehicle is provided by the battery frame.

Conventional battery housing concepts and/or battery frame concepts often employ a certain number of aluminum extrusion profiles, which are used as longitudinal beams and/or crossbeams, to achieve a rigid mechanical structure of the battery frame and/or the battery housing and, thus, the overall battery pack. Those parts are often used for mechanical support and for cooling of the battery cells. Due to constant pressure to reduce overall costs and package space, it is common to integrate the rows of stacked battery cells as so called "battery cell stacks" directly between the "beams", that is, the longitudinal beams and the crossbeams, such as aluminum extrusion profiles. The battery cells themselves are mostly joined to the beams (or carriers or profiles) via structural adhesive material.

Conventionally, the battery frame is sub- or pre-assembled, such as by using aluminum (Al) extrusion profiles or steel sheet metal parts which are welded together into one unit (e.g., a single piece part, such as a casted Al-housing or a deep drawn steel tub). In other cases, the battery frame may include a plurality of single components that are to be assembled by the battery manufacturer in a pre-assembly process. However, irrespective of the battery frame, the general assembly procedure of a battery system by the battery manufacturer includes the step of installing a pre-assembled battery module (e.g., a cell stack arrangement or a row of stacked battery cells) in the battery frame. A recent and cost-efficient variant is to install a slightly over-pressed cell-stack row directly into an appropriate cell compartment in the battery frame, which is referred to as "Cell to Pack".

Conventional the battery frames are not entirely modular. For example, it is not efficiently possible to utilize a large, welded steel battery frame of an electric vehicle battery pack for a small plug-in hybrid battery pack. Thus, to construct the battery frame for differently dimensioned battery packs, individual components with specific part numbers (e.g., longitudinal beams and/or crossbeams) defining the size of the frame and, thus, the battery pack need to be manufactured for each type of battery pack. Especially if the mechanical structure is based on a casted Al housing or deep-drawn steel tub, a complete tooling is necessary for each different size component. Furthermore, a casted Al housing is limited in size due to the required clamping force of a diecast machine.

Pre-assembled battery frames or single piece housings are relatively large, which leads to considerable costs and/or difficulties regarding the logistics, such as shipping. Also, the handling in the production process itself is much more complex compared to a small and lightweight battery frame or housing.

Joining technique for pre-assembled battery frames are spot- and/or laser-welding. For multimaterial-mix housings or battery frames including extrusion profiles and die-cast parts, a proper mechanic joining often uses structural gluing in combination with rivets, flow form screws, etc. Such connections with structural adhesive material are sensitive and need to be monitored very accurately.

Further, to provide thermal control of the battery pack, a thermal management system is required to safely use the battery module by efficiently emitting, discharging, and/or dissipating heat generated from its rechargeable batteries. If the heat emission/discharge/dissipation is not sufficiently performed, temperature deviations occur between respective battery cells such that the battery module may no longer generate a desired amount of power. In addition, an increase of the internal temperature of the battery cells can lead to abnormal reactions occurring therein, and thus, charging and discharging performance of the rechargeable deteriorates and the life-span of the rechargeable battery is shortened. Thus, cell cooling for effectively emitting/discharging/dissipating heat from the cells is desired.

Typically, a liquid cooled battery pack with prismatic cells uses a sheet metal cooling plate or a partially integrated cooler, which is attached to a bottom or top side of the cells. Bottom- and/or top-side cooling concepts require appropriate space increases, such as in the total height of the battery pack. Lateral cooling concepts are often not cost-effective.

SUMMARY

Accord to embodiments of the present disclosure, at least some of the drawbacks of the prior art are overcome or mitigated and a battery pack and a battery frame for a battery pack having the above-mentioned characteristics (e.g., amount of different required parts, manufacture costs, mechanical properties, manufacturability, and thermal control) are improved over the prior art.

The present disclosure is defined by the appended claims and their equivalents. The description that follows is subject to this limitation. Any disclosure lying outside the scope of said claims and their equivalents is intended for illustrative as well as comparative purposes.

According to one embodiment of the present disclosure, a battery frame for providing structural support for a battery pack for retaining rows of stacked battery cells includes a plurality of (e.g., two) longitudinal beams and a plurality of crossbeams arranged between and connected to the longitudinal beams. The plurality of crossbeams are arranged in parallel to each other and include two outer crossbeams and at least one inner crossbeam. The at least one inner crossbeam is arranged between the outer crossbeams. A retaining section for retaining one row of stacked battery cells is provided between any neighboring pair of the crossbeams so that rows of stacked battery cells and the at least one inner crossbeam are alternately stackable (e.g., alternately arranged) between the two outer crossbeams, and each of the crossbeams is connected to the two longitudinal beams by a plurality of fasteners extending in a longitudinal direction of the crossbeams through the longitudinal beams and into the crossbeams.

According to another embodiment of the present disclosure, a battery pack includes a plurality of rows of stacked battery cells and a battery frame as described above. The number of inner crossbeams equals the number of rows of stacked battery cells reduced by one, and each of the rows of stacked battery cells is mounted between a pair of adjacent crossbeams.

Another embodiment of the present disclosure provides a vehicle using a power source including the battery pack as above described.

Another embodiment of the present disclosure provides a method of assembling a battery frame as described above. The method includes: providing the longitudinal beams and the crossbeams; arranging each of the crossbeams between the longitudinal beams so that a retaining section for retaining one row of stacked battery cells is provided between any neighboring pair of the crossbeams so that rows of stacked battery cells and the at least one inner crossbeam are alternately stackable between the two outer crossbeams; and mechanically interconnecting the two longitudinal beams and the plurality of crossbeams with each other by a plurality of fasteners extending in a longitudinal direction of the crossbeams through the longitudinal beams and into the crossbeams.

Another embodiment of the present disclosure provides a method of assembling a battery pack according to the present disclosure. The method includes: providing the crossbeams and the rows of stacked battery cells; stacking the crossbeams and the rows of stacked battery cells such that the inner crossbeams and the rows of stacked battery cells are alternately stacked between the two outer crossbeams; providing the longitudinal beams; and mechanically interconnecting the longitudinal beams and the plurality of crossbeams with each other by the plurality of fasteners extending in a longitudinal direction of the crossbeams through the longitudinal beams and into the crossbeams.

Another embodiment of the present disclosure provides a method of assembling a battery pack as described in the present disclosure. The method includes: providing a battery frame as described in the present disclosure; providing a plurality of rows of stacked battery cells; and arranging one of the rows of stacked battery cells in each of the retaining sections provided by (or formed by) the battery frame.

Further aspects and features of the present disclosure can be learned from the dependent claims and/or the following description.

BRIEF DESCRIPTION OF THE DRAWINGS

Aspects and features of the present disclosure will become apparent to those of ordinary skill in the art by describing, in detail, embodiments thereof with reference to the attached drawings in which.

DETAILED DESCRIPTION

Figure 1:
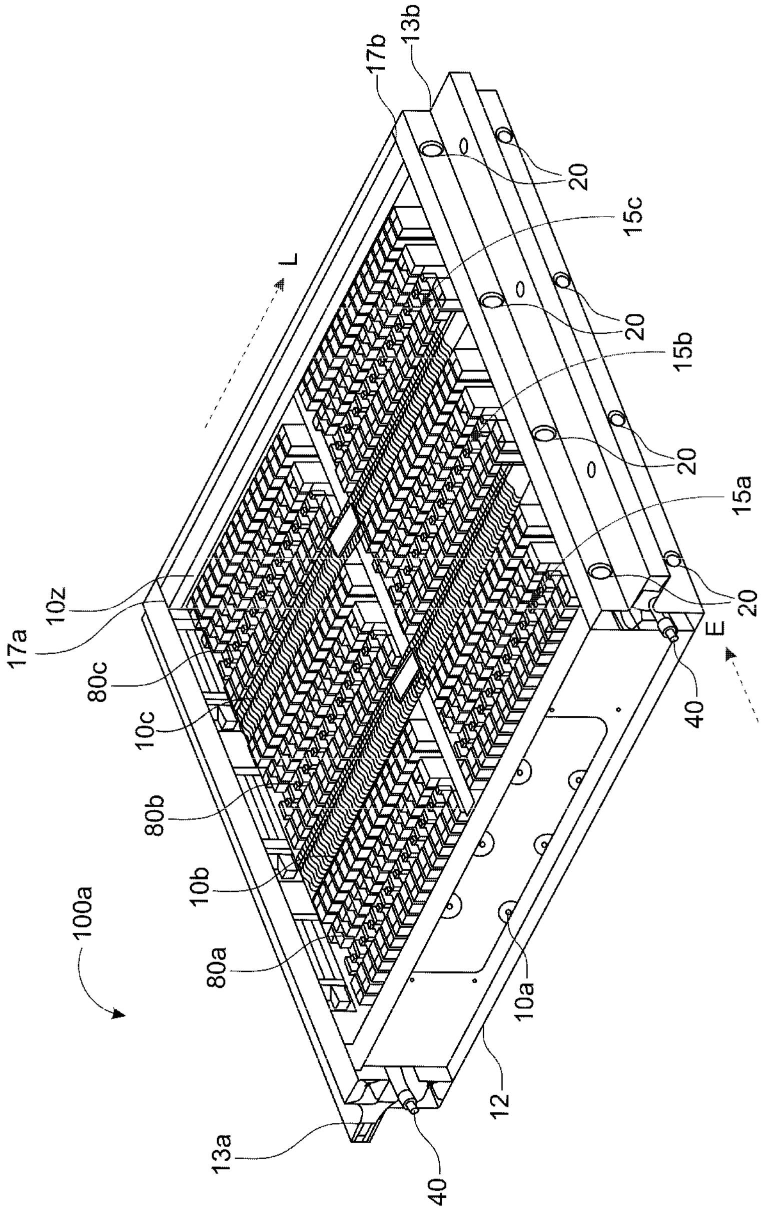
FIG. 1 is a perspective view of a battery pack according to an embodiment.

Reference will now be made in detail to embodiments, examples of which are illustrated in the accompanying drawings. Aspects and features of the embodiments, and implementation methods thereof, will be described with reference to the accompanying drawings. In the drawings, like reference numerals denote like elements, and redundant descriptions are omitted.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. As used herein, the term "and/or" includes any and all combinations of one or more of the associated listed items. Further, the use of "may" when describing embodiments of the present disclosure relates to "one or more embodiments of the present disclosure." Expressions, such as "at least one of," when preceding a list of elements, modify the entire list of elements and do not modify the individual elements of the list. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

In the following, the terms "upper" and "lower" are defined with respect to the orientation of the illustrated subject-matter in the figures. If a Cartesian coordinate system is shown in a figure, the terms "upper" and "lower" are defined with respect to the x-axis of the coordinate system. For example, the upper cover is positioned at the upper part of the x-axis, whereas the lower cover is positioned at the lower part thereof. In the drawings, the sizes of elements may be exaggerated for clarity. For example, in the drawings, the size or thickness of each element may be arbitrarily shown for illustrative purposes, and thus the embodiments of the present disclosure should not be construed as being limited thereto.

The present disclosure may, however, be embodied in various different forms and should not be construed as being limited to the embodiments illustrated herein. Rather, these embodiments are provided as examples so that this disclosure will be thorough and complete and will fully convey the aspects and features of the present disclosure to those skilled in the art. Accordingly, processes, elements, and techniques that are not necessary to those having ordinary skill in the art for a complete understanding of the aspects and features of the present disclosure may not be described.

According to one embodiment of the present disclosure, a battery frame for providing structural support for a battery pack for retaining rows of stacked battery cells includes: a plurality of (e.g., two) longitudinal beams and a plurality of crossbeams arranged between and connected to the longitudinal beams.

The crossbeams are arranged in parallel to each other, and the plurality of crossbeams includes two outer crossbeams and at least one inner crossbeam. The at least one inner crossbeam is arranged between the outer crossbeams. Thus, the frame and its arrangement of crossbeams includes, in the following order, a first outer crossbeam, the at least one inner crossbeam, and a second outer crossbeam. The longitudinal beams and the crossbeams define the shape of the battery frame.

A retaining section for retaining one row of stacked battery cells is provided between any neighboring (e.g., adjacent) pair of crossbeams. Any neighboring pair of crossbeams is arranged in a non-contacting manner (e.g., is spaced apart) with a certain distance between the neighboring pair of crossbeams. Thus, the arrangement of crossbeams provides the first outer crossbeam, a first retaining section, a first inner crossbeam, a second retaining section, (optionally) a second inner crossbeam, (optionally) a third retaining section, etc., and the second outer crossbeam. Thus, the retaining sections and the crossbeams are alternatingly arranged. Therefore, the rows of stacked battery cells and the at least one inner crossbeam are alternately stackable between the two outer crossbeams.

Each of the crossbeams is connected to the two longitudinal beams by a plurality of fasteners to assemble the battery frame and to provide mechanical interconnections between the crossbeams and the longitudinal beams. This provides modularity, for example, the same production line may manufacture differently sized battery frames by adapting the size of the longitudinal beams, the size and/or number of crossbeams, and the number of fasteners. This modularity also improves the handling of individual components of a battery pack including the battery frame because the individual components can be efficiently delivered to, and handled in, a production line for the manufacture of the battery pack. The fasteners enable rows of stacked battery cells to be retained between the crossbeams by a load exerted by the longitudinal beams surrounding (e.g., surrounding in a plan view or extending around a periphery of) the retaining section and which are fastened by the fasteners to the crossbeams. Thus, adhesive material to join the longitudinal beams and the crossbeams together may be omitted.

The plurality of fasteners is arranged to extend in a longitudinal direction of the crossbeams through the longitudinal beams and into the crossbeams. For example, the longitudinal beams have openings through which the fasteners extend. Each of the crossbeams extends in a longitudinal direction, and the longitudinal direction defines the largest extension direction (e.g., is the length) of the crossbeam. The fasteners have an elongated shape elongated in the longitudinal direction to extend through the openings in the longitudinal beams and into the crossbeams. The openings are arranged so that the fasteners can extend into the longitudinal direction of the crossbeams. By arranging the plurality of fasteners to extend in the longitudinal direction of the crossbeams, improved usage of construction space and/or of the volume of the longitudinal beams and of the crossbeams is achieved by using a minimal amount of construction space and/or volume of the longitudinal beams within which coolant distribution ducts are typically arranged and/or of the crossbeams within which cooling channels are typically arranged. Thus, thermal control may be improved because the coolant distribution ducts can be constructed with less constraints than with other arrangements of fasteners. The rows of stacked battery cells are to be retained between the crossbeams. This means that the fasteners extending in the longitudinal direction of the crossbeams can exert a load, also called pre-tension or pre-load, on the rows of stacked battery cells in the longitudinal direction in an improved manner. This can contribute the mechanical integration of the rows of stacked battery cells into the retaining sections. Thus, the amount of necessary parts and manufacture cost can be reduced because the mechanical integration of the rows of stacked battery cells is improved and simplified. A battery frame and/or a battery pack according to embodiments of the present disclosure increases the modularity and flexibility while adding value on the supplier side by reducing the part costs and shipping costs. According to the present disclosure, a cost-effective and modular battery concept and/or battery frame concept is provided exhibiting improved mechanical properties that enables an improved thermal control.

According to one embodiment, each of the crossbeams has two opposing crossbeam ends in the longitudinal direction, and each crossbeam extends between its oppositely arranged crossbeam ends. Each of the crossbeams includes, at each of the crossbeam ends, at least one locking member configured to receive one of the fasteners so that any of the crossbeam ends can be mounted to one of the longitudinal beams. Each of the locking members and each of the fasteners are configured to fasten the crossbeam and the longitudinal beam through which the fastener extends. The fastener and the locking member are configured to engage with each other in a form locking manner and/or in a load-carrying connecting manner. In some embodiments, the fastener and the locking member are configured to be reversibly engageable with each other so that a damage-free disassembly of the battery frame is possible.

According to one embodiment, the fasteners include screws or bolts, and each of the locking members has a hole (e.g., an opening) to receive one of the screws or bolts. In some embodiments, each of the locking members may have a blind hole or a through hole that is threaded so that the screw or bolt can engage with the locking member. This provides a cost-effective and reversibly mountable and dismountable battery frame. In other embodiments, the fasteners include clip, pins, and/or clamps, which engage a corresponding locking member by elastic or plastic deformation.

According to one embodiment, each of the crossbeams includes a cooling channel extending along the longitudinal direction through the crossbeam to provide efficient cooling of the rows of stacked battery cells, which are to be arranged between and/or next to the crossbeams. Each of the crossbeams has two opposing crossbeam ends and includes, at each of the crossbeam ends, two locking members configured to receive one of the fasteners, respectively. This enhances the mechanical properties of the battery frame and the possibility of exerting a load on a row of stacked battery cells when placed in a corresponding retaining section between the crossbeams. At each of the crossbeam ends, the cooling channel is arranged between the two locking members. This allows an effective and symmetric arrangement of the cooling channel, which provides homogeneously distributed cooling properties. The symmetric arrangement of fasteners provides homogeneous distribution of load so that the longitudinal beams can be mounted without being tilted due to asymmetrically distributed fasteners and resulting torque (or moment).

According to one embodiment, the two longitudinal beams are arranged in parallel to each other, and each of the two longitudinal beams is elongated along an elongation direction perpendicular to the longitudinal direction of the crossbeams to provide an effective arrangement of longitudinal beams and crossbeams. When the lengths of the longitudinal beams are equal each other and the lengths of the crossbeams are equal each other, any of the retaining sections has a rectangular cross-section facilitating the integration of the rows of stacked battery cells.

According to one embodiment, the longitudinal beams and/or the crossbeams are extruded aluminum, rolled steel, or long fiber reinforced thermoplastics beams to provide cost-effective and efficiently manufacturable longitudinal beams and/or crossbeams.

According to one embodiment, the crossbeams are extruded beams, and the fasteners extend into extruded through holes in the crossbeams into the locking members of the crossbeams to provide cost-effective and efficiently manufacturable longitudinal beams and/or crossbeams. By providing the locking members to extend through extruded through holes in the crossbeam, differently-sized battery frames may be efficiently manufactured by providing crossbeams of a different length in their longitudinal direction for each of the differently-sized battery frames.

According to another embodiment of the present disclosure, a battery pack includes: a plurality of (e.g., at least two) rows of stacked battery cells; and the battery frame according to an embodiment of the present disclosure. Therein, the number of inner crossbeams is equal the number of rows of stacked battery cells minus one. Therein, each of the rows of stacked battery cells is mounted between a pair of adjacent crossbeams. Thus, the rows of stacked battery cells and the crossbeams are arranged in an alternating manner. For example, the arrangement of crossbeams and of rows of stacked battery cells provides, in the following order, the first outer crossbeam, a first row of stacked battery cells, a first inner crossbeam, a second row of stacked battery cells, (optionally) a second inner crossbeam, (optionally) a third row of stacked battery cells, etc., and the second outer crossbeam. The battery pack is particularly efficiently manufacturable. The arrangement of the fasteners may impart a load from the longitudinal beams to the rows of stacked battery cells to improve and simplify the mechanical integration of the rows of stacked battery cells into the battery pack. The battery pack and its battery frame may include any of the above-mentioned optional features.

According to another embodiment of the present disclosure, a vehicle using a power source including the battery pack according to embodiments of the present disclosure is provided. The vehicle, its battery pack, and its battery frame may include any of the above-mentioned optional features.

According to another embodiment of the present disclosure, a method of assembling a battery frame according to an embodiment of the present disclosure includes: providing the two longitudinal beams and the plurality of crossbeams; arranging each of the crossbeams between the longitudinal beams so that a retaining section for retaining one row of stacked battery cells is provided between any neighboring pair of crossbeams so that rows of stacked battery cells and the at least one inner crossbeam are alternately stackable between the two outer crossbeams; and mechanically interconnecting the two longitudinal beams and the plurality of crossbeams with each other by a plurality of fasteners extending in a longitudinal direction of the crossbeams through the longitudinal beams and into the crossbeams. The above-mentioned method steps can be performed in any suitable order. For example, the method steps may be performed in the order as described above or in another order. For example, it also possible that, in the following order, a first longitudinal beam and the crossbeams are provided, the crossbeams are arranged next to the first longitudinal beam so that a retaining section for retaining one row of stacked battery cells is provided between any neighboring pair of crossbeams so that rows of stacked battery cells and the at least one inner crossbeam are alternately stackable between the two outer crossbeams, the first longitudinal beams and the plurality of crossbeams are mechanically interconnected with each other by a plurality of fasteners extending in the longitudinal direction of the crossbeams through the first longitudinal beam and into the crossbeams, a second longitudinal beam is provided, the second longitudinal beam is arranged next to the crossbeams oppositely to the first crossbeam, and the second longitudinal beam is mechanically connected with crossbeams by a plurality of fasteners extending in the longitudinal direction of the crossbeams through the second longitudinal beam and into the crossbeams. The method allows for efficient assembly of a plurality of differently-sized battery frames by the same method by providing differently-sized longitudinal beams, differently-sized crossbeams, and/or a different number of crossbeams.

According to another embodiment of the present disclosure, a method of assembling a battery pack according to an embodiment of the present disclosure includes: providing the plurality of crossbeams and the at least two rows of stacked battery cells; stacking the plurality of crossbeams and the at least two rows of stacked battery cells such that the inner crossbeams and the at least two rows of stacked battery cells are alternately stacked between the two outer crossbeams; providing the two longitudinal beams; and mechanically interconnecting the two longitudinal beams and the plurality of crossbeams with each other by the plurality of fasteners extending in a longitudinal direction of the crossbeams through the longitudinal beams and into the crossbeams. The above-mentioned method steps can be performed in any suitable order. The method allows for efficient assembly of a plurality of differently-sized battery packs by the same method by providing differently-sized longitudinal beams, differently-sized crossbeams and rows of stacked battery cells, and/or a different number of crossbeams and of rows of stacked battery cells. Stacking the plurality of crossbeams and the at least two rows of stacked battery cells such that the inner crossbeams and the at least two rows of stacked battery cells are alternately stacked between the two outer crossbeams provides a pre-assembled cell stack arrangement, including a pre-assembled battery module. The method provides that the longitudinal beams are structural parts to be built around rows of cell stacks, which may be referred to as "Pack to Cell".

According to another embodiment of the present disclosure, a method of assembling a battery pack according to an embodiment of the present disclosure includes: providing a battery frame according to an embodiment of the present disclosure; providing a plurality of rows of stacked battery cells; and arranging one of the rows of stacked battery cells in each of the retaining sections provided by the battery frame. Accordingly, the battery frame is pre-assembled. In some embodiments, subsequent to arranging one of the rows of stacked battery cells in each of the retaining sections provided by the battery frame, the load exerted by longitudinal beams to the rows of stacked battery cells may be increased by further fastening the fasteners (e.g., by increasing the load exerted by the fasteners). For example, when the fasteners include screws and/or bolts, the load exerted by longitudinal beams to the rows of stacked battery cells may be increased by increasing the torque used to fasten the fasteners. The above-mentioned method steps can be performed in any suitable order. The method allows for efficient assembly a plurality of differently-sized battery packs by the same method by providing differently-sized longitudinal beams, differently-sized crossbeams and rows of stacked battery cells, and/or a different number of crossbeams and rows of stacked battery cells.

According to one embodiment, a first battery pack and a second battery pack are assembled according to an embodiment of the present disclosure at the same production line while the first battery pack has a different size than the second battery pack. This is possible by providing differently-sized longitudinal beams, differently-sized crossbeams and rows of stacked battery cells, and/or a different number of crossbeams and rows of stacked battery cells for the first battery pack and for the second battery pack.

According to one embodiment, the first battery pack includes a different number of crossbeams and longitudinal beams having different lengths than the crossbeams and longitudinal beams of the second battery pack. This embodiment includes differently-shaped battery packs having a different number of rows of stacked battery cells and a different size of the longitudinal beam in elongation direction.

According to one embodiment, the first battery pack includes crossbeams having different lengths than the crossbeams of the second battery pack. This embodiment includes differently-shaped battery packs with the same number of rows of stacked battery cells and the same size of the longitudinal beam in an elongation direction but having a different size in the longitudinal direction of the crossbeams. Thus, each of the rows of stacked battery cells of the first battery pack may include a different number of battery cells than a row of stacked battery cells of the second battery pack.

FIG. 1 illustrates a perspective view of a battery pack 100*a* according to an embodiment. FIG. 1 shows the battery pack 100*a* in a mounted state, for example, including a battery frame 12 and a plurality of rows of stacked battery cells 80*a*, 80*b*, 80*c* in an assembled stated.

The battery pack 100*a* includes the plurality of rows of stacked battery cells 80*a*, 80*b*, 80*c* (three rows of stacked battery cells 80*a*, 80*b*, 80*c* in the illustrated embodiment). However, any number of stacked battery cells 80*a*, 80*b*, 80*c* greater than one is possible. The battery pack 100*a* includes the battery frame 12. The battery frame 12 is configured to provide structural support for the battery pack 100*a* for retaining the rows of stacked battery cells 80*a*, 80*b*, 80*c*.

The battery frame 12 includes two longitudinal beams 13*a*, 13*b* and a plurality of crossbeams 10*a*, 10*b*, 10*c*, 10*z* arranged between and connected to the longitudinal beams 13*a*, 13*b*.

The crossbeams 10*a*, 10*b*, 10*c*, 10*z* are arranged in parallel to each other, and the plurality of crossbeams 10*a*, 10*b*, 10*c*, 10*z* includes two outer crossbeams 10*a*, 10*z* and, in the illustrated embodiment, two inner crossbeams 10*b*, 10*c*. The inner crossbeams 10*b*, 10*c* are arranged between the outer crossbeams 10*a*, 10*z*. The crossbeams 10*a*, 10*b*, 10*c*, 10*z* are further described with reference to FIG. 2.

Different battery packs may include a different number of crossbeams 10*a*, 10*b*, 10*c*, 10*z* and/or differently-sized longitudinal beams 13*a*, 13*b* to provide a differently sized shape of the battery frame 12 (see, e.g., FIGS. 3, 6, and 7 and the corresponding descriptions below).

As illustrated in FIG. 1, a retaining section 15*a*, 15*b*, 15*c* for retaining one row of stacked battery cells 80*a*, 80*b*, 80*c* is provided between any neighboring (e.g., adjacent) pair of crossbeams 10*a*, 10*b*, 10*c*, 10*z* so that rows of stacked battery cells 80*a*, 80*b*, 80*c* and the crossbeams 10*b*, 10*c* are alternately stacked (e.g., alternatively arranged) between the two outer crossbeams 10*a*, 10*z*. The retaining sections 15*a*, 15*b*, 15*c* provide compartments to retain the rows of stacked battery cells 80*a*, 80*b*, 80*c*. Thus, the length of each of the crossbeams 10*a*, 10*b*, 10*c*, 10*z* in a longitudinal direction L from one longitudinal beam 13*a* to the other longitudinal beam 13*b* matches the length of the rows of stacked battery cells 80*a*, 80*b*, 80*c* so that the rows of stacked battery cells 80*a*, 80*b*, 80*c* can be arranged in the retaining sections 15*a*, 15*b*, 15*c* and retained therein.

The two longitudinal beams 13*a*, 13*b* are arranged in parallel to each other, and each of the two longitudinal beams 13*a*, 13*b* is elongated in an elongation direction E that is perpendicular to the longitudinal direction L of the crossbeams 10*a*, 10*b*, 10*c*, 10*z*. For example, the crossbeams 10*a*, 10*b*, 10*c*, 10*z* and the two longitudinal beams 13*a*, 13*b* are arranged perpendicular to each other. Thus, each of the retaining sections 15*a*, 15*b*, 15*c* has a rectangular cross-section to retain the rows of stacked battery cells 80*a*, 80*b*, 80*c*. The length of the two longitudinal beams 13*a*, 13*b* in the elongation direction E matches the sum of the widths of the crossbeams 10*a*, 10*b*, 10*c*, 10*z* and of the rows of stacked battery cells 80*a*, 80*b*, 80*c*.

Figure 4A:
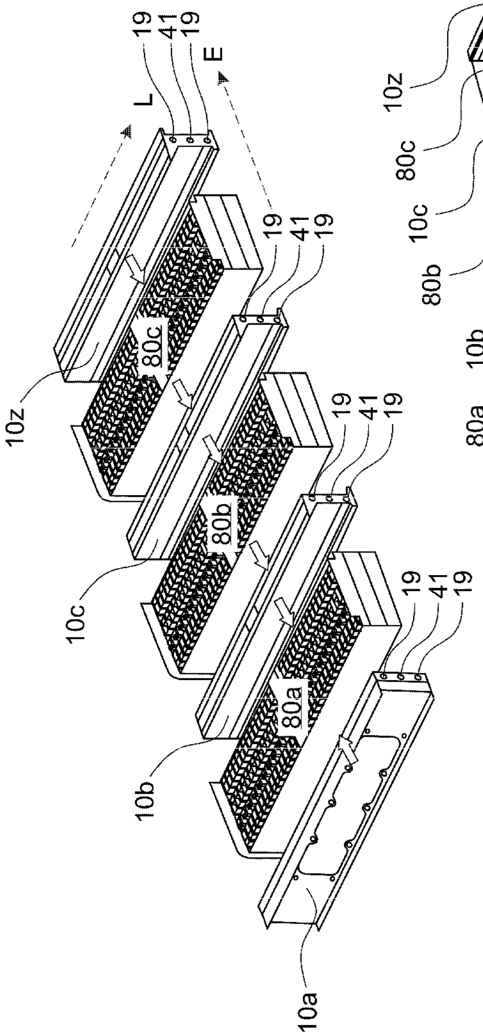
FIGS. 4(A)-4(D) illustrate a method of assembling the battery pack shown in FIG. 1 according to an embodiment.
Figure 4B:
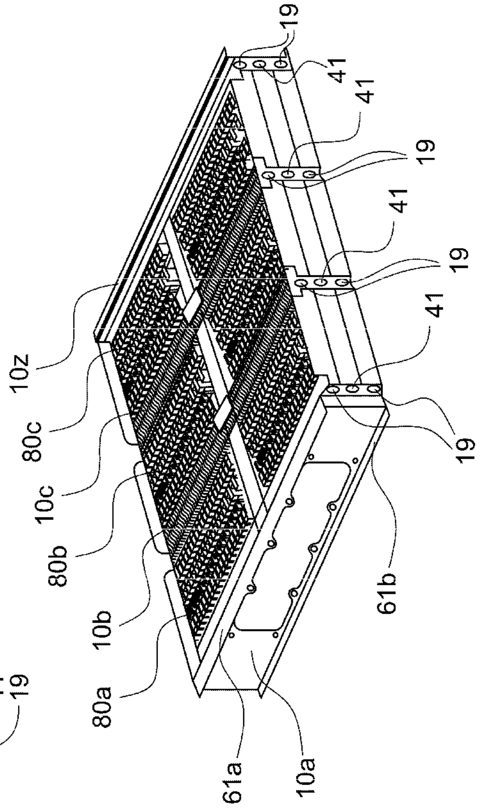
Figure 4C:
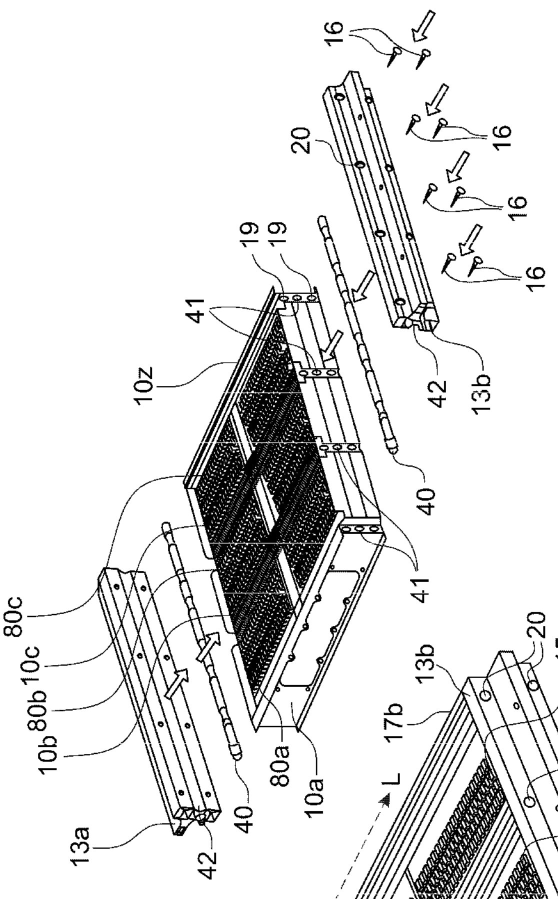

Each of the crossbeams 10*a*, 10*b*, 10*c*, 10*z* is connected to the two longitudinal beams 13*a*, 13*b* by a plurality of fasteners 16 (see, e.g., FIG. 4(C)) extending in the longitudinal direction L of the crossbeams 10*a*, 10*b*, 10*c*, 10*z* through the longitudinal beams 13*a*, 13*b* and into the crossbeams 10*a*, 10*b*, 10*c*, 10*d*, 10*z*. The longitudinal beams 13*a*, 13*b* have openings 20 through which the fasteners 16 extend. The openings 20 are arranged so that the fasteners 16 can extend in the longitudinal direction L of the crossbeams 10*a*, 10*b*, 10*c*, 10*z* and into the crossbeams 10*a*, 10*b*, 10*c*, 10*z*. For example, each of the longitudinal beams 13*a*, 13*b* has two openings 20 arranged for each of the crossbeams 10*a*, 10*b*, 10*c*, 10*z* arranged to match the position of (e.g., aligned with) the crossbeams 10*a*, 10*b*, 10*c*, 10*z* and their locking members 19 (see, e.g., FIG. 2).

Each of the crossbeams 10*a*, 10*b*, 10*c*, 10*z* has two opposing crossbeam ends 17*a*, 17*b* (for clear illustration, only the two opposing ends 17*a*, 17*b* of the outer crossbeam 10*z* is indicated). In the longitudinal direction L, each of the crossbeam 10*a*, 10*b*, 10*c*, 10*z* extends between its oppositely arranged crossbeam ends 17*a*, 17*b*. The longitudinal beams 13*a*, 13*b* are mounted to the opposing ends 17*a*, 17*b* of the crossbeams 10*a*, 10*b*, 10*c*, 10*z*, as further explained with reference to FIG. 3.

The battery pack 100*a* includes two coolant distribution ducts 40 to allow a coolant fluid to flow via the coolant distribution ducts 40 through cooling channels 41 of the crossbeams 10*a*, 10*b*, 10*c*, 10*z* (see, e.g., FIG. 2) to cool the crossbeams 10*a*, 10*b*, 10*c*, 10*z* and, thereby, to cool the rows of stacked battery cells 80*a*, 80*b*, 80*c*.

The longitudinal beams 13*a*, 13*b* and the crossbeams 10*a*, 10*b*, 10*c*, 10*z* are, in one embodiment, extruded beams. The number of inner crossbeams 10*b*, 10*c* equals the number of rows of stacked battery cells 80*a*, 80*b*, 80*c* minus one. Each of the rows of stacked battery cells 80*a*, 80*b*, 80*c* is mounted between a pair of adjacent crossbeams 10*a*, 10*b*, 10*c*, 10*z*.

Figure 2:
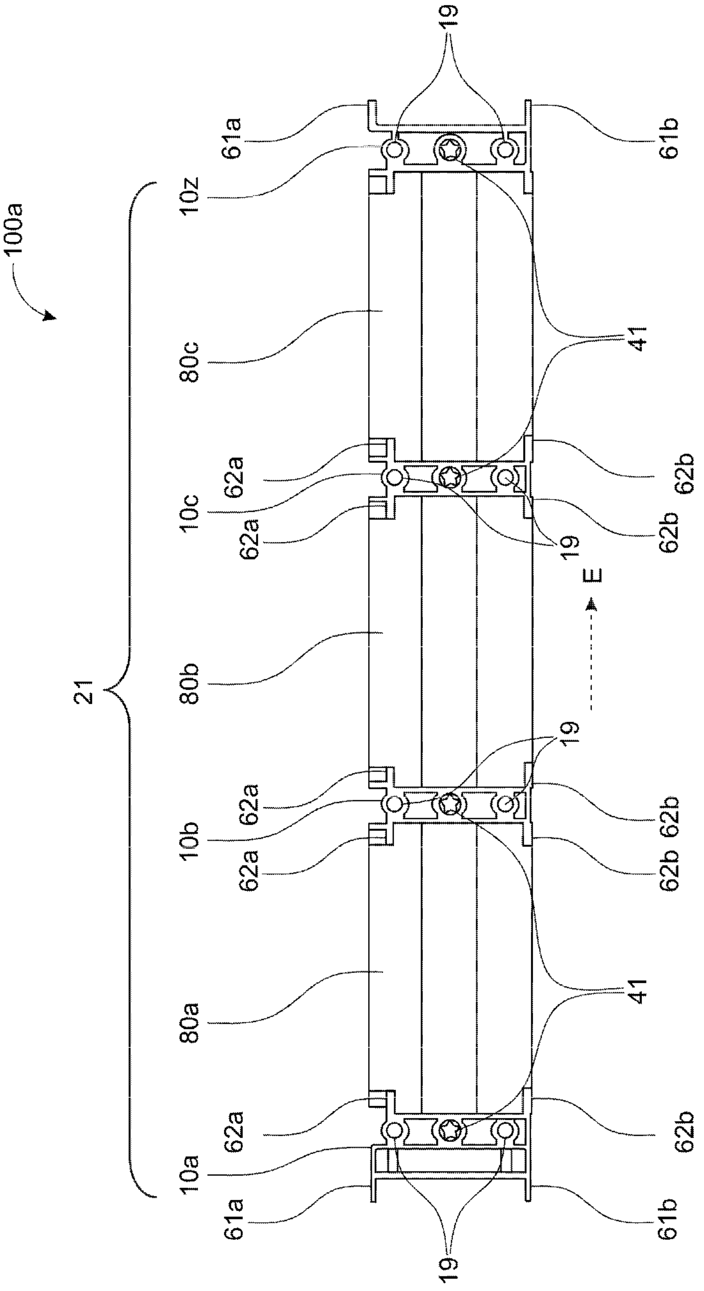
FIG. 2 is a cross-sectional view of the battery pack shown in FIG. 1.

FIG. 2 is a cross-sectional view of the battery pack 100*a* shown in FIG. 1. The cross-sectional view of the battery pack 100*a* can also be considered as a side view of the battery pack 100*a* when one or both of the longitudinal beams 13*a*, 13*b* is removed. The side view of the battery pack 100*a* shows one of the opposing ends 17*a*, 17*b* of the crossbeams 10*a*, 10*b*, 10*c*, 10*z*. In this illustration, the longitudinal direction L of the crossbeams 10*a*, 10*b*, 10*c*, 10*z* is perpendicular to the drawing plane, that is, the longitudinal direction L points into or out of the drawing plane. The elongation direction E of the longitudinal beams 13*a*, 13*b* is indicated by a dashed arrow.

The crossbeams 10*a*, 10*b*, 10*c*, 10*z* and the rows of stacked battery cells 80*a*, 80*b*, 80*c* are stacked such that the inner crossbeams 10*b*, 10*c* and the rows of stacked battery cells 80*a*, 80*b*, 80*c* are alternately stacked between the two outer crossbeams 10*a*, 10*z*. The stacked arrangement of crossbeams 10*a*, 10*b*, 10*c*, 10*z* and rows of stacked battery cells 80*a*, 80*b*, 80*c* is referred to as a cell stack arrangement 21.

To support lateral sides of the rows of stacked battery cells 80*a*, 80*b*, 80*c*, the crossbeams 10*a*, 10*b*, 10*c*, 10*z* include a plurality of flanges 61*a*, 61*b*, 62*a*, 62*b*. The flanges 61*a*, 61*b*, 62*a*, 62*b* may be arranged on either edge of the crossbeams 10*a*, 10*b*, 10*c*, 10*z* along the longitudinal direction L of the crossbeams 10*a*, 10*b*, 10*c*, 10*z*. Two flanges 61*a*, 61*b*, 62*a*, 62*b* on one side of each of the crossbeams 10*a*, 10*b*, 10*c*, 10*z* may have a distance between the two other flanges 61*a*, 61*b*, 62*a*, 62*b* on the other side of each of the crossbeams 10*a*, 10*b*, 10*c*, 10*z* that encompasses a lateral side of a row of stacked battery cells 80*a*, 80*b*, 80*c*.

The outer flanges 61*a*, 61*b* of the outer crossbeams 10*a*, 10*z*, (e.g., the front- and rear-end of the cell stack arrangement 21) are arranged and configured (e.g., shaped) to provide a proper circumferential sealing flange for covers on top- and bottom-sides of the battery pack 100*a*. The outer crossbeams 10*a*, 10*z* may include integration members of connector interfaces and cooling interfaces, such as an interface for a battery management system.

Each of the crossbeams 10*a*, 10*b*, 10*c*, 10*z* includes an integrated cooling channel 41 arranged within the crossbeam 10*a*, 10*b*, 10*c*, 10*z*. The cooling channel 41 of each of the crossbeams 10*a*, 10*b*, 10*c*, 10*z* extends in the longitudinal direction L of the crossbeam 10*a*, 10*b*, 10*c*, 10*z* so that the coolant fluid can flow from one of the opposing ends 17*a* of the crossbeam 10*a*, 10*b*, 10*c*, 10*z* through the crossbeam 10*a*, 10*b*, 10*c*, 10*z* to the other of the opposing ends 17*b* of the crossbeam 10*a*, 10*b*, 10*c*, 10*z*. Each of the crossbeams 10*a*, 10*b*, 10*c*, 10*z* includes locking members 19. The locking members 19 of each of the crossbeams 10*a*, 10*b*, 10*c*, 10*z* are through holes extending in the longitudinal direction L of the crossbeam 10*a*, 10*b*, 10*c*, 10*d* from one of the opposing ends 17*a* of the crossbeam 10*a*, 10*b*, 10*c*, 10*z* through the crossbeam 10*a*, 10*b*, 10*c*, 10*z* to the other of the opposing ends 17*b* of the crossbeam 10*a*, 10*b*, 10*c*, 10*z*. The crossbeams 10*a*, 10*b*, 10*c*, 10*z* are, in one embodiment, aluminum extrusion (Al-extrusion) profiles to simply and cost-effectively integrate cooling channels 41 and to form the extruded through holes that are the locking members 19 of the crossbeams 10*a*, 10*b*, 10*c*, 10*z* into the crossbeams 10*a*, 10*b*, 10*c*, 10*z*.

The locking members 19 are arranged and configured to receive the fasteners 16 so that the fasteners 16 extend into and engage with the locking members 19 of the crossbeams 10*a*, 10*b*, 10*c*, 10*z*. For example, when the fasteners 16 include bolts and/or screws, the locking members 19 may include a threaded section to engage with the fasteners 16.

Each of the crossbeams 10*a*, 10*b*, 10*c*, 10*z* includes, at each of the crossbeam ends 17*a*, 17*b*, two locking members 19 configured to receive one of the fasteners 16, respectively. The cooling channel 41 of each of the crossbeams 10*a*, 10*b*, 10*c*, 10*z* is arranged between the locking member 19 of the crossbeam 10*a*, 10*b*, 10*c*, 10*z*. This provides a symmetric distribution of load exerted by the fasteners 16. At each of the crossbeam ends 17*a*, 17*b* of each of the crossbeams 10*a*, 10*b*, 10*c*, 10*z*, the cooling channel 41 is arranged between the two locking members 19. This provides a central arrangement of the cooling channel 41 and, thereby, an improved cooling of the rows of stacked battery cells 80*a*, 80*b*, 80*c* arranged adjacent to and in contact with the crossbeams 10*a*, 10*b*, 10*c*, 10*z*.

Figure 3:
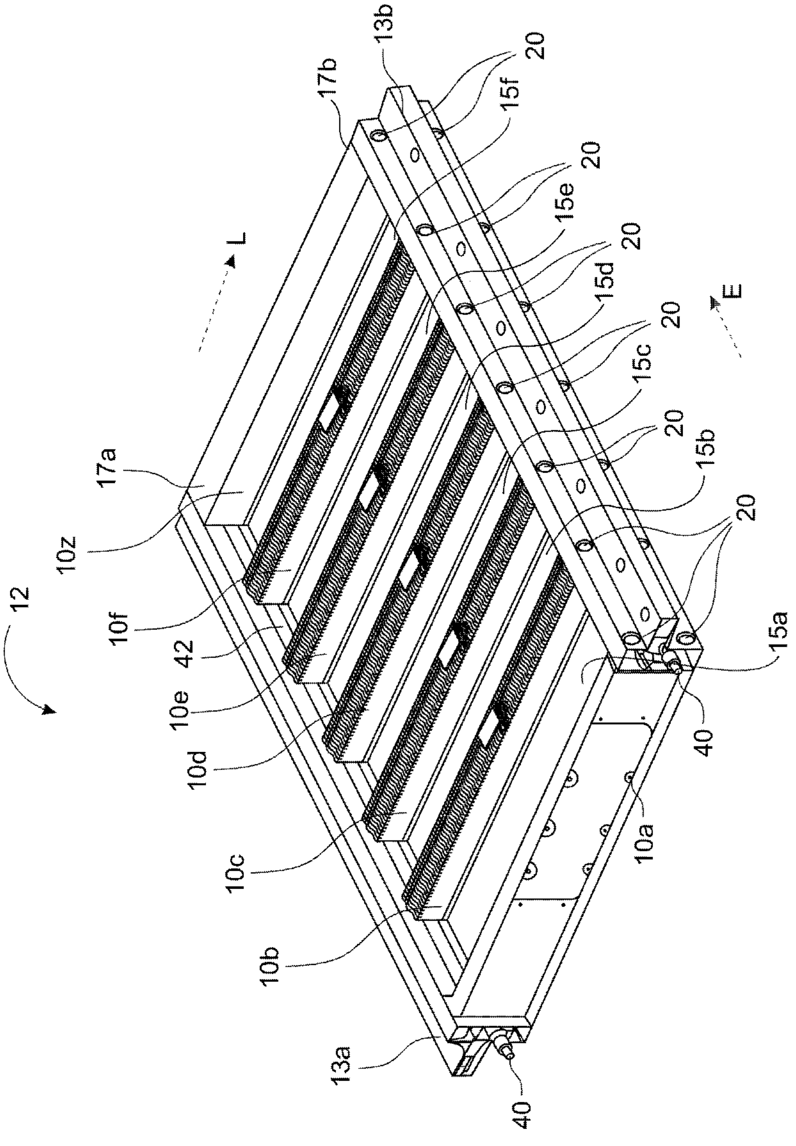
FIG. 3 is a perspective view of a battery frame according to an embodiment.

FIG. 3 is a perspective view of a battery frame 12 according to an embodiment. The battery frame 12 is analogously constructed as the battery frame 12 of the battery pack 100*a* as shown in FIG. 1 with the difference being that the battery frame 12 shown in FIG. 3 includes a different number of crossbeams 10*a*, 10*b*, 10*c*, 10*d*, 10*e*, 10*f*, 10*z* and, thus, includes a different number of retaining sections 15*a*, 15*b*, 15*c*, 15*d*, 15*e*, 15*f* and different longitudinal beams 13*a*, 13*b* compared to the battery frame 12 of the battery pack 100*a* shown in FIG. 1. For example, when the width of each of the rows of stacked battery cells 80*a*, 80*b*, 80*c* in FIG. 1 (e.g., the size of the rows of stacked battery cells 80*a*, 80*b*, 80*c* in elongation direction E) corresponds to the width of each of the retaining sections 15*a*, 15*b*, 15*c*, 15*d*, 15*e*, 15*f*, the two longitudinal beams 13*a*, 13*b* in FIG. 3 are longer than the two longitudinal beams 13*a*, 13*b* in FIG. 1. Thus, a differently sized battery frame 12 is provided compared to battery frame 12 of the battery pack 100*a* shown in FIG. 1. The battery frame 12 as shown in FIG. 3 may be used to assemble a battery pack 100*b* as shown and described with reference to FIG. 7.

Each of the longitudinal beams 13*a*, 13*b* includes a duct retainer 42 in the form of a recess in the longitudinal beams 13*a*, 13*b* to retain one of the coolant distribution ducts 40. The duct retainer 42 is arranged between the openings 20 and extends in the elongation direction E of the longitudinal beams 13*a*, 13*b*. The coolant distribution ducts 40 are mechanically connected with the cooling channels 41 of the crossbeams 10*a*, 10*b*, 10*c*, 10*z* to allow coolant fluid to flow via the coolant distribution ducts 40 through the cooling channels 41 (see, e.g., FIG. 2).

FIGS. 4(A)-4(D) illustrate a method of assembling the battery pack 100*a* according to an embodiment. The battery pack 100*a* is shown in FIGS. 1 and 2 and described with reference thereto. FIGS. 4(A), 4(B), 4(C), and 4(D) illustrate different steps of the method. Therein, performing a method step is indicated by one or more arrows with solid lines.

As illustrated in FIG. 4(A), the plurality of crossbeams 10*a*, 10*b*, 10*c*, 10*z* and the rows of stacked battery cells 80*a*, 80*b*, 80*c* are provided. The crossbeams 10*a*, 10*b*, 10*c*, 10*z* and the rows of stacked battery cells 80*a*, 80*b*, 80*c* are stacked such that the inner crossbeams 10*b*, 10*c* and the rows of stacked battery cells 80*a*, 80*b*, 80*c* are alternately stacked between the two outer crossbeams 10*a*, 10*z* as shown in FIG. 4(B). The length of the crossbeams 10*a*, 10*b*, 10*c*, 10*z* (e.g., the elongation of the crossbeams 10*a*, 10*b*, 10*c*, 10*z* in the longitudinal direction L) matches the length of the rows of stacked battery cells 80*a*, 80*b*, 80*c* in the longitudinal direction L. The stacked rows of stacked battery cells 80*a*, 80*b*, 80*c* and crossbeams 10*a*, 10*b*, 10*c*, 10*z* are referred to as cell stack arrangement 21. The cell stack arrangement 21 is compact and has an essentially rectangular cross-section depending on the dimension of the battery pack 100*a*, which is to be assembled.

Subsequently, as illustrated in FIG. 4(C), the longitudinal beams 13*a*, 13*b*, coolant distribution ducts 40, and fasteners 16 are provided. Once the rows of stacked battery cells 80*a*, 80*b*, 80*c*, are joined with the crossbeams 10*a*, 10*b*, 10*c*, 10*z*, the battery frame can be closed by longitudinal beams 13*a*, 13*b*, which will be joined with fasteners (e.g., screw fasteners) 16 from the lateral sides. The fasteners 16 include screws or bolts, and each of the locking members 19 has a hole (e.g., an opening) to receive one of the screws or bolts.

Each of the longitudinal beams 13*a*, 13*b* has a duct retainer 42 in the form of a recess in the longitudinal beams 13*a*, 13*b* to retain one of the coolant distribution ducts 40. The duct retainer 42 is arranged between the openings 20 and extends along the elongation direction E of the longitudinal beams 13*a*, 13*b*. The coolant distribution ducts 40 are mechanically connected with the cooling channels 41 of the crossbeams 10*a*, 10*b*, 10*c*, 10*z* to allow coolant fluid to flow via the coolant distribution ducts 40 through the cooling channels 41 (see, e.g., FIG. 2). The coolant distribution ducts 40 are arranged in the duct retainers 42 before the fasteners 16.

The two longitudinal beams 13*a*, 13*b* and the crossbeams 10*a*, 10*b*, 10*c*, 10*z* are mechanically interconnected with each other by the fasteners 16 extending in the longitudinal direction L of the crossbeams 10*a*, 10*b*, 10*c*, 10*z* through the openings 20 in the longitudinal beams 13*a*, 13*b* and into the locking members 19 of the crossbeams 10*a*, 10*b*, 10*c*, 10*z*.

Depending on the layout of the battery pack 100*a*, additional parts may be integrated, such as sealing plates between the longitudinal beams 13*a*, 13*b* and the pre-assembled cell stack arrangement 21.

Figure 4D:
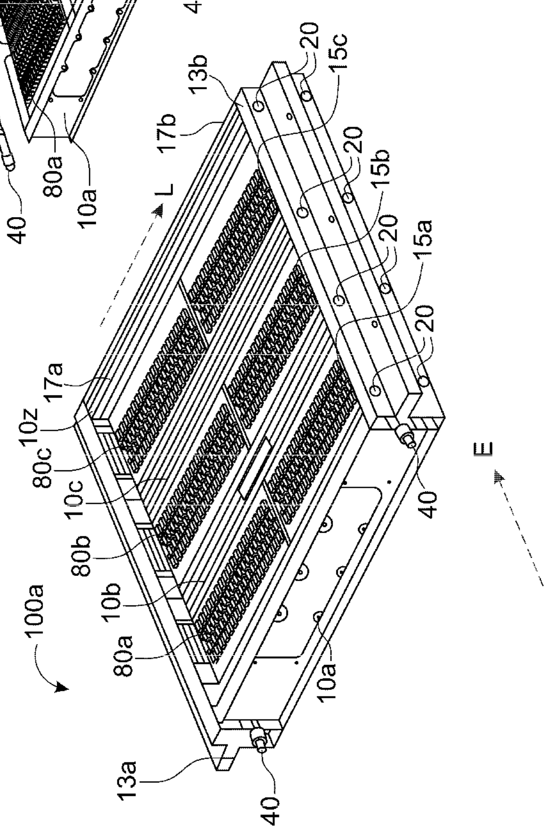

The resulting battery pack 100*a* is shown in FIG. 4(D). In some embodiments, the battery pack 100*a* can be closed by a top cover and/or a bottom cover.

Figure 5:
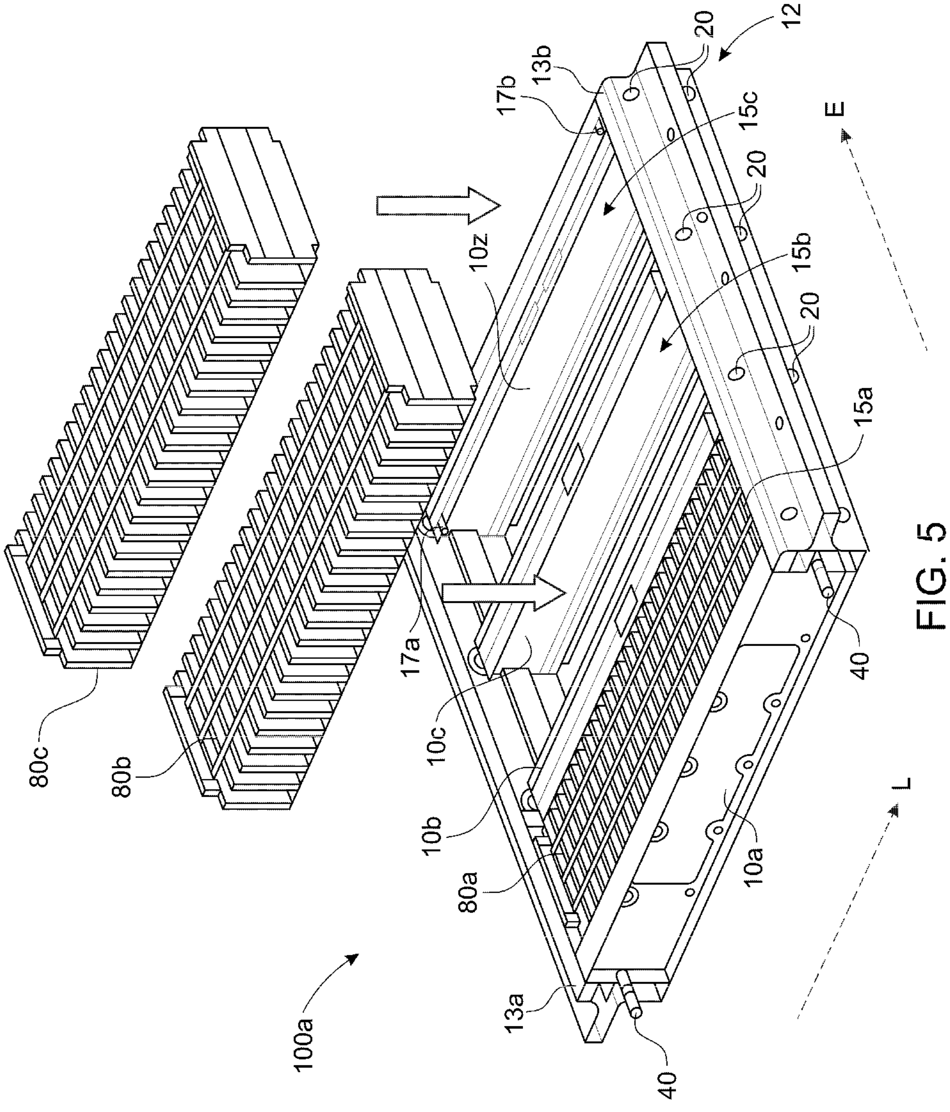
FIG. 5 illustrates a method of assembling a battery pack according to another embodiment.

FIG. 5 illustrates a method of assembling a battery pack 100*a* according to another embodiment. The battery pack 100*a* is shown in FIGS. 1 and 2 and described with reference thereto. In FIG. 5, a method step is indicated by an arrow with a solid line.

The method of assembling the battery pack 100*a* includes, first, that a battery frame 12 according to a previously-described embodiment of the present disclosure is provided. Further, the rows of stacked battery cells 80*a*, 80*b*, 80*c* are provided.

One of the rows of stacked battery cells 80*a*, 80*b*, 80*c* is arranged in each of the retaining sections 15*a*, 15*b*, 15*c* provided by the battery frame 12.

Figure 6:
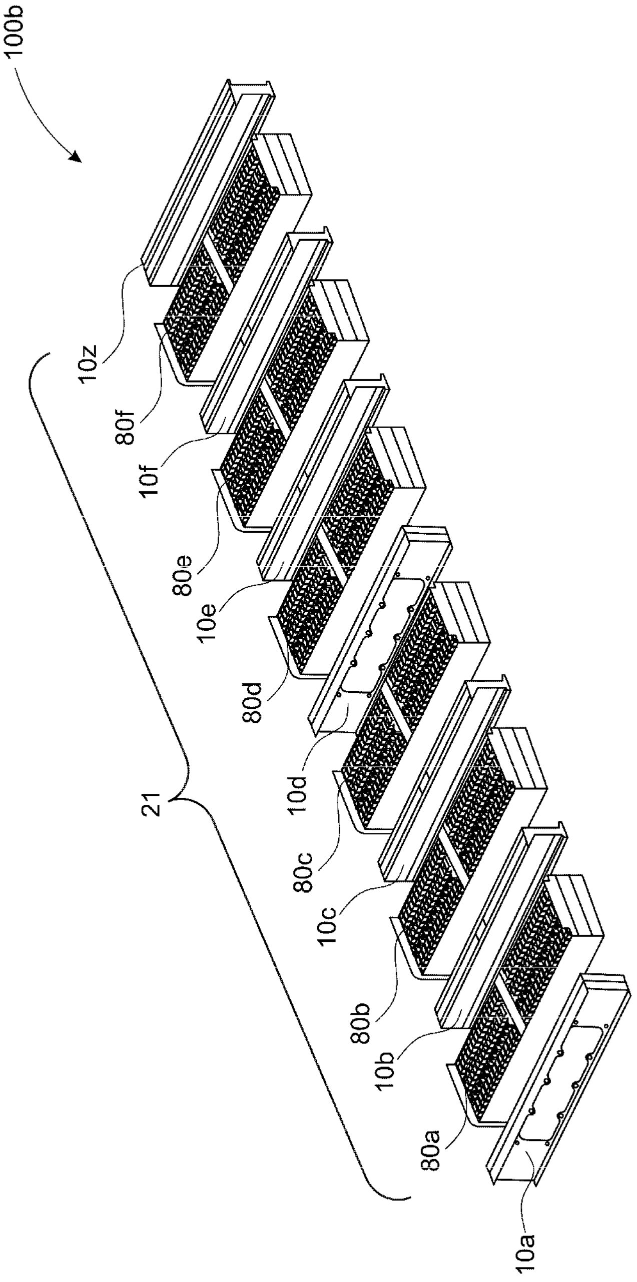
FIG. 6 illustrates a method step of assembling a battery pack according to another embodiment.

FIG. 6 illustrates a method step of assembling a battery pack 100*b* according to another embodiment. The method step as shown in FIG. 6 is analogously performed as the method step as illustrated in FIG. 4(A) with the difference being that a different number of crossbeams 10*a*, 10*b*, 10*c*, 10*d*, 10*e*, 10*f*, 10*z* and a different number of rows of stacked battery cells 80*a*, 80*b*, 80*c*, 80*d*, 80*e*, 80*f* is provided. In this embodiment, the inner crossbeam 10*d* is of the same type as one of the outer crossbeams 10*a*, 10*z*. Due to the modularity of the battery packs 100*a*, 100*b*, a first section of the cell stack arrangement 21, including the outer crossbeam 10*a*, the first row of stacked battery cells 80*a*, the inner crossbeam 10*b*, the second row of stacked battery cells 80*b*, the inner crossbeam 10*c*, and the third row of stacked battery cells 80*c*, may first be assembled and then the second sections of the cell stack arrangement 21, including the fourth row of stacked battery cells 80*d*, the inner crossbeam 10*e*, the fifth row of stacked battery cells 80*e*, the inner crossbeam 10*f*, the sixth row of stacked battery cells 80*f* and the outer crossbeam 10*z*, may be assembled. The first and second sections of the cell stack arrangement 21 are assembled and joined together by the intermediate crossbeam 10*d*, which acts as an outer crossbeam for each of the sections of the cell stack arrangement 21.

By installing two times three rows of stacked battery cells 80*a*, 80*b*, 80*c* and 80*d*, 80*e*, 80*f* and two sets of crossbeams 10*a*, 10*b*, 10*c* and 10*e*, 10*f*, 10*z*, the battery pack 100*b* has double the size and capacity than the battery pack 100*a* shown in FIGS. 1 and 2. Only the length of longitudinal beam 13*a*, 13*b* has to be adapted (or modified). The profile and/or shape of the longitudinal beams 13*a*, 13*b* are the same as in the battery pack 100*a* shown in FIGS. 1, 2, and 4(A)-4(D). In some embodiments, the capacity, current, and/or voltage of a battery pack 100*a*, 100*b* may be changed by, additionally or alternatively, installing longer or shorter rows of stacked battery cells 80*a*, 80*b*, 80*c*, 80*d*, 80*e*, 80*f*. Therein, the length of the crossbeams 10*a*, 10*b*, 10*c*, 10*d*, 10*e*, 10*f*, 10*z* has to be changed. However, the assembly process of the battery pack 100*a*, 100*b* and the equipment needed for manufacture are the same.

The crossbeams 10*a*, 10*b*, 10*c*, 10*d*, 10*e*, 10*f*, 10*z* and rows of stacked battery cells 80*a*, 80*b*, 80*c*, 80*d*, 80*e*, 80*f* can be analogously assembled to a battery pack 100*b* as shown in FIG. 4(B) to FIG. 4(D) with the difference being that two different longitudinal beams 13*a*, 13*b* are provided. For example, when the width of the rows of stacked battery cells 80*a*, 80*b*, 80*c*, 80*d*, 80*e*, 80*f* in FIGS. 4 and 6 are equal, the two longitudinal beams 13*a*, 13*b* to be mounted subsequent to the method step shown in FIG. 6 are longer than the two longitudinal beams 13*a*, 13*b* as mounted and shown in FIGS. 4(C) and 4(D). However, it is also possible to use two pairs of longitudinal beams 13*a*, 13*b* instead of one pair of longitudinal beams 13*a*, 13*b*. In such an embodiment, differently sized battery packs 100*b* can be provided by using the same longitudinal beams 13*a*, 13*b*. Thus, a differently sized battery pack 100*b* can be provided by the method step as shown in FIG. 6 compared to the battery pack 100*a* as shown FIGS. 1, 2 and 4(A)-4(D).

Figure 7A:
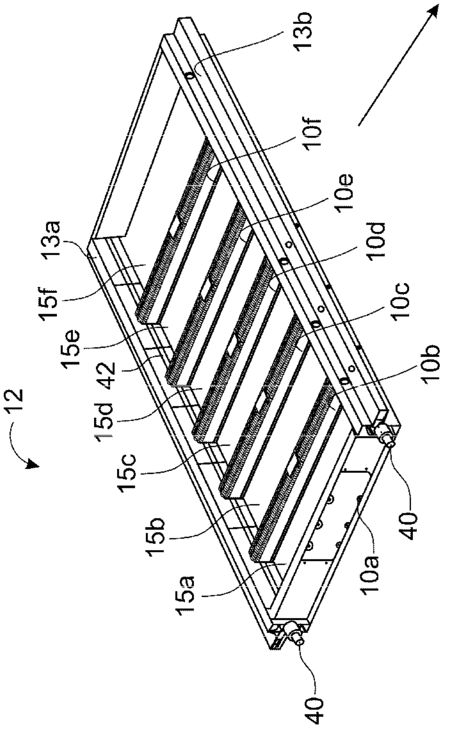
FIGS. 7(A)-7(B) illustrate a method of assembling a battery pack according to another embodiment.
Figure 7B:
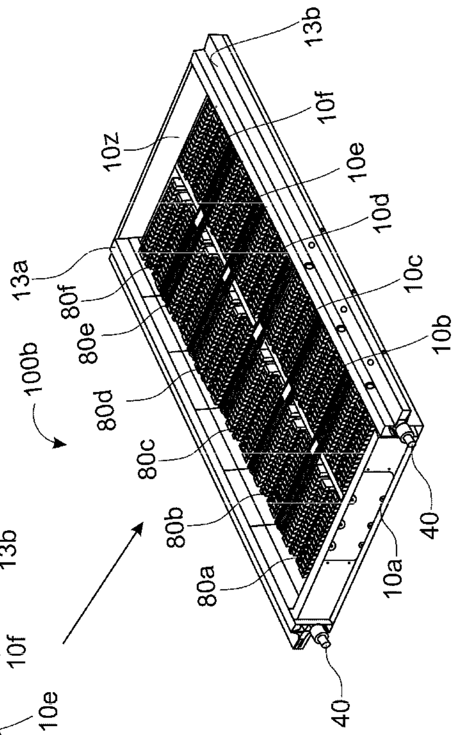

FIGS. 7(A)-7(B) illustrate a method of assembling a battery pack 100*b* according to another embodiment. The battery pack 100*b* is analogously constructed as the battery pack 100*a* as illustrated in FIG. 1 with the difference being that the battery frame 12 is the battery frame as shown in FIG. 3 and described with reference thereto. However, the method of assembly is analogously performed as shown in FIG. 5 and explained with reference thereto, with the difference being that the number of rows of stacked battery cells 80*a*, 80*b*, 80*c*, 80*d*, 80*e*, 80*f* is different in the embodiment shown in FIG. 7 compared to the number of rows of stacked battery cells 80*a*, 80*b*, 80*c* of the battery pack 100*a* shown in FIG. 1.

SOME REFERENCE SIGNS

10*a*, 10*z* outer crossbeam
10*b*, 10*c*, 10*d*, 10*e*, 10*f* inner crossbeam
12 battery frame
13*a*, 13*b* longitudinal beam
15*a*, 15*b*, 15*c*, 15*d*, 15*e*, 15*f* retaining section
16 fastener
17*a*, 17*b* crossbeam end
19 locking member
20 opening
21 cell stack arrangement
40 coolant distribution duct
41 cooling channel
42 duct retainer
61*a*, 61*b* flanges
62*a*, 62*a* flanges
80*a*, 80*b*, 80*c*, 80*d*, 80*e*, 80*f* rows of stacked battery cells
100*a*, 100*b* battery pack
E elongation direction
L longitudinal direction

What is claimed is:

1. A battery frame for providing structural support for a battery pack for retaining rows of stacked battery cells, the battery frame comprising a plurality of longitudinal beams and a plurality of crossbeams arranged between and connected to the longitudinal beams, wherein the crossbeams are arranged in parallel to each other and comprise two outer crossbeams, an intermediate crossbeam, and a plurality of inner crossbeams, the intermediate crossbeam being arranged between the two outer crossbeams, at least one of the plurality of inner crossbeams being arranged between the intermediate crossbeam and one of the two outer crossbeams, respectively, wherein a retaining section for retaining one of the rows of stacked battery cells is provided between any neighboring pair of the crossbeams so that the rows of stacked battery cells are alternately arranged between the two outer crossbeams, the plurality of inner crossbeams, and the intermediate crossbeam, wherein each of the crossbeams is connected to the longitudinal beams by a plurality of fasteners extending in a longitudinal direction of the crossbeams through the longitudinal beams and into the crossbeams, wherein the two outer crossbeams comprise upper and lower flanges respectively extending away from the retaining section, wherein the inner crossbeams comprise upper and lower flanges extending toward adjacent ones of the rows of stacked battery cells, the upper flanges of the inner crossbeams being nearer to a bottom surface of the battery frame than the upper flanges of the outer crossbeams are, and wherein the intermediate crossbeam comprises upper and lower flanges at heights above the bottom surface of the battery frame the same as the upper and lower flanges of the outer crossbeams.

2. The battery frame as claimed in claim 1, wherein each of the crossbeams comprises two opposing crossbeam ends, and wherein each of the crossbeams comprises, at each of the crossbeam ends, a locking member configured to receive one of the fasteners.

3. The battery frame as claimed in claim 2, wherein the fasteners comprise screws or bolts, and wherein each of the locking members has an opening to receive one of the fasteners.

4. The battery frame as claimed in claim 1, wherein each of the crossbeams comprises a cooling channel extending through the crossbeam in the longitudinal direction, wherein each of the crossbeams comprises two opposing crossbeam ends and, at each of the crossbeam ends, two locking members configured to receive one of the fasteners, respectively, and wherein the cooling channel is arranged between the two locking members at each of the crossbeam ends.

5. The battery frame as claimed in claim 1, wherein the longitudinal beams are arranged in parallel to each other, and wherein each of the longitudinal beams is elongated in an elongation direction that is perpendicular to the longitudinal direction of the crossbeams.

6. The battery frame as claimed in claim 1, wherein the longitudinal beams and/or the crossbeams are extruded aluminum, rolled steel, or long fiber reinforced thermoplastics beams.

7. The battery frame as claimed in claim 1, wherein the crossbeams are extruded beams, and wherein the fasteners extend into extruded openings of the crossbeams.

8. The battery pack according to claim 1 comprising the plurality of rows of stacked battery cells and the battery frame according to claim 1, wherein a number of the inner crossbeams equals a number of the rows of stacked battery cells reduced by two, and wherein each of the rows of stacked battery cells is mounted between a pair of adjacent ones of the crossbeams.

9. A vehicle using a power source and comprising the battery pack according to claim 8.

10. A method of assembling a battery frame according to claim 1, the method comprising:

providing the longitudinal beams and the crossbeams;

arranging each of the crossbeams between the longitudinal beams to form a retaining section for retaining one of the rows of stacked battery cells between any neighboring pair of the crossbeams so that the rows of stacked battery cells and the inner crossbeam are alternately arranged between the two outer crossbeams; and mechanically interconnecting the longitudinal beams and the crossbeams with each other by the fasteners extending in the longitudinal direction of the crossbeams through the longitudinal beams and into the crossbeams.

11. A method of assembling the battery pack according to claim 8, the method comprising:

providing the crossbeams and the rows of stacked battery cells;

stacking the plurality of crossbeams and the rows of stacked battery cells such that the inner crossbeams and the rows of stacked battery cells are alternately arranged between the two outer crossbeams;

providing the longitudinal beams; and mechanically interconnecting the longitudinal beams and the crossbeams with each other by the fasteners extending in the longitudinal direction of the crossbeams through the longitudinal beams and into the crossbeams.

12. A method of assembling the battery pack according to claim 8, the method comprising:

providing the battery frame;

providing a plurality of rows of stacked battery cells; and arranging one of the rows of stacked battery cells in each of the retaining sections formed by the battery frame.

13. The method according to claim 12, wherein a first battery pack and a second battery pack are assembled, wherein the first battery pack and the second battery pack are assembled on the same production line, and wherein the first battery pack has a different size compared to the second battery pack.

14. The method as claimed in claim 13, wherein the first battery pack comprises a different number of the crossbeams than the second battery pack, and wherein the longitudinal beams of the first battery pack have different lengths than the longitudinal beams of the second battery pack.

15. The method as claimed in claim 14, wherein the crossbeams of the first battery pack have different lengths than the crossbeams of the second battery pack.

* * * * *